United States Patent
Joyce

(12) 
(10) Patent No.: US 6,327,402 B1
(45) Date of Patent: Dec. 4, 2001

(54) LIGHTWAVE TRANSMISSION SYSTEM HAVING WIDE PUMP WAVEBANDS

(75) Inventor: William B. Joyce, Basking Ridge, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/244,528

(22) Filed: Feb. 4, 1999

(51) Int. Cl.[7] ............ G02B 6/26; H01S 3/0933; H01S 3/13
(52) U.S. Cl. ............ 385/27; 359/341; 359/345; 372/6; 372/32; 372/75
(58) Field of Search ............ 385/15, 24, 27, 385/31, 37, 39; 372/6, 20, 23, 24, 29.02, 32, 69, 70, 71, 75, 96; 359/333, 341, 345

(56) References Cited

U.S. PATENT DOCUMENTS

| | | | |
|---|---|---|---|
| 4,786,132 | 11/1988 | Gordon | 385/38 |
| 4,905,253 | 2/1990 | Chraplyvy | 372/96 |
| 4,955,028 | 9/1990 | Alferness et al. | 372/20 |
| 5,039,199 | 8/1991 | Molleanauer et al. | 359/334 |
| 5,058,974 | 10/1991 | Molleanauer | 385/27 |
| 5,220,578 | 6/1993 | Koch et al. | 372/96 |
| 5,717,711 | 2/1998 | Doussiere et al. | 372/102 |
| 5,717,804 | 2/1998 | Pan et al. | 385/94 |
| 5,724,377 | 3/1998 | Huang | 372/98 |
| 5,768,012 | 6/1998 | Zanoni et al. | 359/341 |
| 5,790,722 | 8/1998 | Minden et al. | 385/27 |
| 5,805,621 | 9/1998 | Grubb et al. | 372/6 |
| 5,812,306 | * 9/1998 | Mizrahi | 359/341 |
| 5,815,518 | 9/1998 | Reed et al. | 372/6 |
| 5,892,781 | * 4/1999 | Pan et al. | 372/6 |
| 5,910,962 | * 6/1999 | Pan et al. | 372/6 |
| 5,930,029 | * 7/1999 | Mehuys | 359/341 |
| 5,936,763 | 8/1999 | Mitsuda et al. | 359/341 |
| 5,991,070 | * 11/1999 | Zanoni et al. | 359/341 |
| 6,008,933 | * 12/1999 | Grubb et al. | 359/341 |
| 6,144,486 | * 11/2000 | Bennett et al. | 359/341 |
| 6,167,075 | * 12/2000 | Craig et al. | 372/75 |

* cited by examiner

Primary Examiner—John D. Lee
(74) Attorney, Agent, or Firm—J. De La Rosa

(57) ABSTRACT

The present invention is directed to a novel wavelength division multiplexed (WDM) lightwave communication system having allocated wide bands of wavelengths within which the respective optical pump light employed to amplify the optical signals must stay. As the temperature of the pump laser varies, its lasing wavelength is allowed to wander anywhere within its allocated wavelength band. Preferably, the pump lasers are wavelength stabilized within its respective allocated wavelength band by means of a fiber Bragg grating having an appropriately wide spectral width. Extending the lasing wavelength range of the pump laser advantageously, in turn, may be used to extend the temperature range over which the pump laser can be operated or locked.

49 Claims, 4 Drawing Sheets

LIGHTWAVE TRANSMISSION SYSTEM HAVING WIDE PUMP WAVEBANDS

TECHNICAL FIELD

The present invention relates to lightwave transmission systems, and, more particularly, to wavelength division multiplexed (WDM) lightwave transmission systems employing optical fiber amplifiers.

BACKGROUND OF THE INVENTION

Current wavelength division multiplexed (WDM) lightwave communication systems strive for maximum transmission capacity by spacing optical channels as closely as possible, typically about or less than a nanometer (nm). Additionally, in such lightwave communication systems, Erbium (Er) doped optical fiber amplifiers are typically used to maintain the amplitude and integrity of the optical signals over long distance spans. While transmission capacity is greatly increased, it cannot be overlooked that stable lasing transmission wavelengths are critical to system operation inasmuch as any drift of the laser's wavelength readily causes signals from one optical channel to cross into another. As such, current designs for WDM communication systems specify relatively stable, narrow linewidth transmission lasers, typically employing external fiber gratings to stabilize the lasing wavelengths with variations in temperature.

In such communication systems, a factor affecting the optical gain of the Er-doped fiber amplifier (EDFA) is the wavelength used to optically pump the optical signals. Due to its higher gain efficiency, it is preferable to pump near the 980 nm absorption band of the Erbium. For reliability considerations, however, several low power pump lasers may be employed to generate the required pump power levels.

In current WDM lightwave communication systems, pump lasers are also required to lase precisely at predetermined wavelengths. One drawback to this design approach is the precise wavelength stabilization requirements for the pump lasers.

SUMMARY OF THE INVENTION

The present invention is directed to a novel wavelength division multiplexed (WDM) lightwave communication system having allocated wide bands of wavelengths (about a few nanometers) within which the respective optical pump light employed to amplify the optical signals must stay. As the temperature of the pump laser varies, its lasing wavelength is allowed to wander anywhere within its allocated wavelength band. Preferably, each pump laser is wavelength stabilized within its respective allocated wavelength band by means of a fiber Bragg grating having an appropriately wide spectral width. Extending the lasing wavelength range of the pump laser advantageously, in turn, may be used to extend the temperature range over which the pump laser can be operated or locked.

In one preferred embodiment, a wavelength division multiplexed (WDM) lightwave communication system carries the desired optical signals over eight independent optical channels. Each of the eight optical channels is allocated a unique band of wavelengths to transmit information over an optical transmission fiber. The corresponding optical channels, generated by a plurality of transmission lasers, are multiplexed into a single stream and coupled into the fiber using a coupler.

The lightwave communication system preferably employs an Erbium (Er) doped optical fiber amplifier to maintain the amplitude and integrity of the optical signals over substantially the entire span of the fiber. One or more pump lasers nominally lasing within the 980 nm absorption band of the Er-doped fiber, are optically coupled to the fiber for co-directionally pumping the optical signals. Preferably, WDM couplers are used for coupling the pump beams from each corresponding pump laser to the fiber over which the optical signals are propagating while simultaneously allowing the transmitted optical signals to propagate through the fiber.

Wide bands of wavelengths of about a few nanometers, are allocated within which the respective wavelengths of the pump lasers must stay. For example, three corresponding wide bands of wavelengths of about three nanometers wide, falling within a portion of the 980 nm absorption band of the Erbrium doped fiber, may be allocated to the pump lasers. These bands of wavelengths herein referred to as "pump wavebands" are allocated within preferably a center portion of the 980 nm absorption band, thereby ensuring a substantially uniform optical gain over the allocated pump wavebands.

Preferably, the pump beams wander only within a smaller portion of the wavebands to facilitate combining and filtering the pump beams into and out of the fiber with some high degree of precision. Accordingly, there are guard bands of about 5% or more of the width of the pump wavebands near each edge of the allocated bands where the pump beams should not reside. Also, the allocated pump wavebands are preferably of equal width, and thus their widths depend on the number of pump lasers employed.

Although the lasing wavelengths of the pump lasers can wander anywhere within their allocated pump wavebands, each pump laser is still preferably wavelength stabilized within its respective allocated pump waveband by means of a fiber Bragg grating, but having an appropriately wide spectral width that corresponds to about the width of its respective allocated waveband. These wide pump wavebands, however, can be used advantageously to extend the temperature range over which the external fiber bragg grating can stabilize the pump laser.

At lower temperatures, so long as laser's gain peak wavelength is within the laser's locking range, the pump laser's lasing wavelength locks to the grating's left edge wavelength. As the temperature now varies and the gain peak wavelength shifts right and within the grating's reflection band, the lasing wavelength of the pump laser coincides with its gain peak wavelength, until it similarly locks onto the grating's other edge wavelength. In this manner, the pump laser's locking range is extended the temperature equivalent of about the spectral width of the reflection band, which is a resulting effect of allowing the lasing wavelengths to wander within the allocated pump wavebands.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention is a novel wavelength division multiplexed (WDM) lightwave communication system having allocated wide bands of wavelengths (about 1 nm to about 10 nm) within which the respective optical pump light employed to amplify the optical signals must stay. As the temperature of each pump laser varies, its lasing wavelength is allowed to wander anywhere within its allocated wavelength band. Preferably, the pump lasers are wavelength stabilized within its respective allocated wavelength band by means of a fiber Bragg grating having an appropriately wide spectral width. Extending the lasing wavelength range of the pump laser advantageously, in turn, may be used to extend the temperature range over which the pump laser can be operated or locked.

Without any loss of generality or applicability for the principles of the invention, the preferred embodiment of the lightwave communication system is described with respect to a communication system employing lasers with external fiber gratings. It should be clearly understood, however, that the present invention is equally applicable to lightwave communication systems employing lasers with other means used to stabilize lasing.

Figure 1:
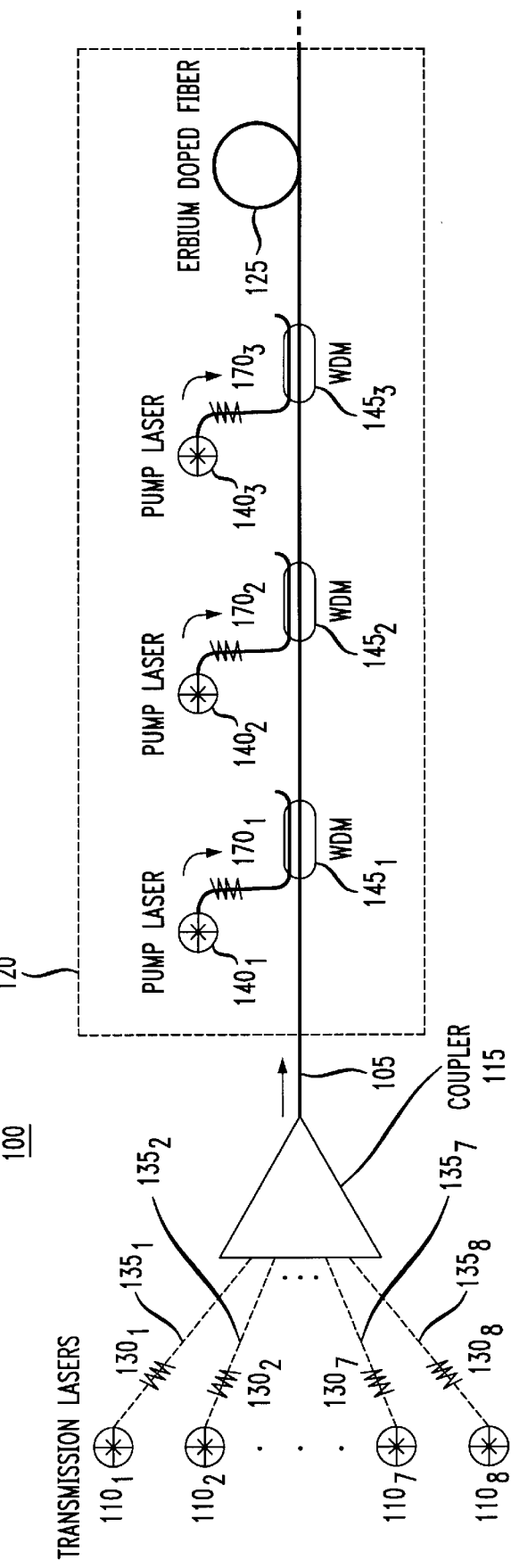
FIG. 1 shows an exemplary WDM lightwave communication system employing the use of allocated wide bands of wavelengths within which the optical pump lasers must reside.

In accordance with the principle of the invention, shown in FIG. 1 is an exemplary wavelength division multiplexed (WDM) lightwave communication system 100 in which an optical transmission fiber 105 carries the desired optical signals over eight (8) independent optical channels, spaced, for example, 200 GHz (1.6 nm) apart. It should be clearly understood by those skilled in the art, however, that the number of optical channels can assume any integer value up to 64 for 80 Km transmission fiber spans. Note that current International Telecommunications Union (ITU) draft standards, intended to cover long distance point-to-point WDM systems, specify from 4 to 32 optical channels with a 400 GHz (3.2 nm) to 100 GHz (0.8 nm) spacing, respectively. Of course, to maximize transmission capacity, the optical channels should preferably be spaced as closely as possible.

Figure 2:
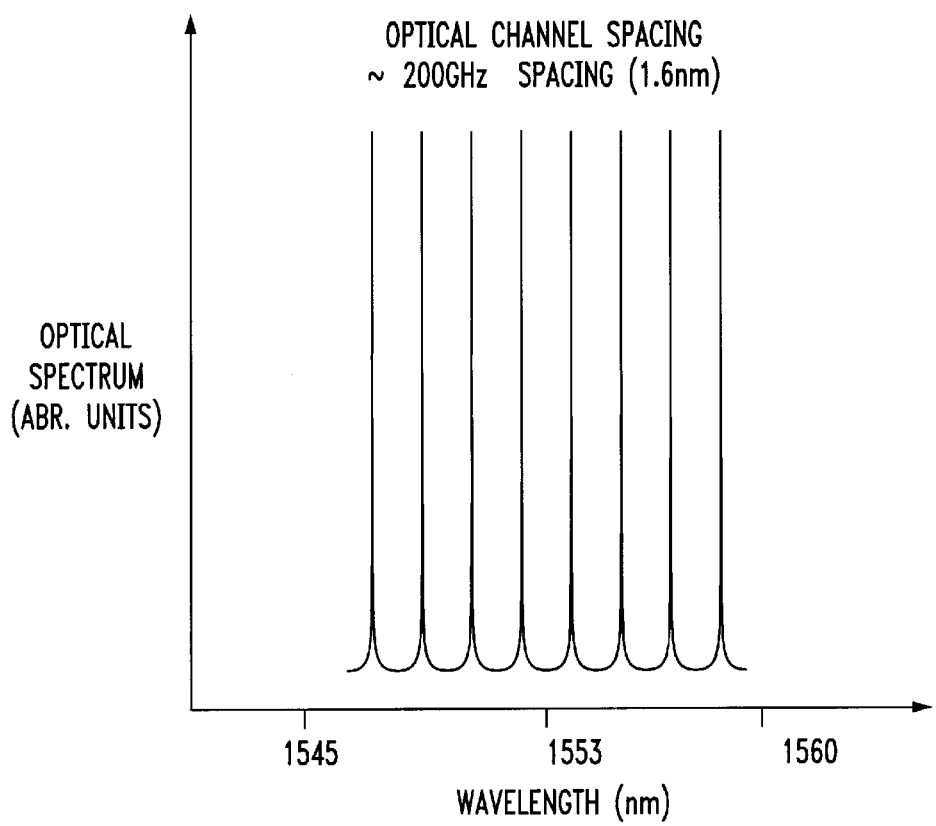
FIG. 2 shows an exemplary optical spectrum for the optical channels of FIG. 1.

As shown in FIG. 2, each of the eight (8) optical channels is allocated a unique band of wavelengths to transmit information over optical transmission fiber 105, preferably in the commonly used 1.55 μm region where the attenuation is the lowest. Referring again now to FIG. 1, the corresponding optical channels, generated by a plurality of transmission lasers $110_{1-8}$, are multiplexed into a single stream and coupled into optical transmission fiber 105 using a coupler 115, such as a wavelength division multiplexer (WDM) coupler, passive coupler, a waveguide grating or other suitable coupling means known by those persons of ordinary skill in the art.

Alternatively, multi-wavelength lasers be employed wherein a number of lasers of different wavelengths are fabricated on the same substrate. Multiline lasers as well may be used which lase at many wavelengths within the same optical cavity. Note that each transmission laser $110_{1-8}$ emits light at a precise wavelength spaced apart from each other, and is associated with a unique optical channel. Each corresponding optical signal, however, has a finite band of wavelengths inasmuch as modulating the laser with information broadens the optical signal, but should still reside within a reasonably narrow center portion of the channel.

WDM lightwave communication system 100 preferably also employs an Erbium (Er) doped optical fiber amplifier 120 to maintain the amplitude and integrity of the optical signals over substantially the entire span of optical transmission fiber 105. Of course, additional optical fiber amplifiers may be used for longer spans (>100 Km) to achieve amplification sufficient to counteract at a minimum the intrinsic loss of the fiber. As the optical signals pass along a short portion of Er-doped fiber 125, within optical amplifier 120 and spliced directly to fiber 105, the optical signals are amplified by up to 30 dB during their travel inasmuch as the wavelengths of the optical signals are judiciously chosen to fall within the optical gain spectrum of Erbium doped fiber amplifier 120 (EDFA), typically between about 1530 and 1570 nm.

More specifically, Erbium doped fiber 125 is pumped with light falling preferably within its 980 nm absorption band, which then excites the Erbium atoms into an excited state. In response to this excitation, Er-doped fiber 125 amplifies the optical signals which pick up energy from the excited atoms as they pass through the Er-doped fiber. Note that the pumping need not to be very close to the amplifying section of the fiber. In some applications, such as undersea systems, it may be desirable to use remote pumping where the pump lasers are situated a long distance away from the amplifier.

Although wavelength division multiplexing greatly increases transmission capacity, it cannot be overlooked that stable transmission lasing wavelengths are critical to system operation inasmuch as any drift of the lasing wavelength readily causes signals from one optical channel to cross into another due to the dense spacing of the optical channels. Of significant importance is wavelength stabilization with temperature. Accordingly, transmission lasers $110_{1-8}$ are preferably extremely stable, narrow linewidth lasers, such as DFBs, or DBRs. Preferably, fiber Bragg gratings $130_{1-8}$ such as in, for example, fibers $135_{1-8}$ coupling lasers $110_{1-8}$ to coupler 115, are employed to stabilize wavelength variations with temperature. Alternatively, fiber grating lasers may be used.

Fiber Bragg gratings $130_{1-8}$ each consists of a periodic variation in the refractive index of the fiber's core, which variation in the figures has been denoted by heavy marks. See, for example, *Lightwave Applications of Fibre Bragg Gratings, IEEE Journal of Lightwave Technology*, Vol. 15, No. 8, August 1997, pp. 1391–1404. In effect, the cavity of each laser now extends into the fiber, with the grating forming one of the laser's end facets. Fiber gratings $130_{1-8}$ are designed to reflect back into the corresponding laser cavity substantially only a single wavelength, typically the gain peak wavelengths λp of the laser at its respective nominal operating temperature. Thus, although the lasers resonate over a range of frequencies, transmission lasers $110_{1-8}$ each is confined to operate at or so-called "locked" to a single wavelength associated with its corresponding optical channel, since there is substantially less feedback at any other wavelength.

It should be clearly understood that so long as the peak wavelength of the grating's reflectance or so-called "grating wavelength" is within the spectral locking range Δ, this locking mechanism causes the laser to lase precisely at the corresponding grating wavelength, even with variations in temperature. However, to do so requires fabricating fiber gratings $130_{1-8}$, with a narrow spectral width, typically only about a few tenths of a nanometer. This arrangement also has the important additional benefit that the linewidth of each laser's output is narrowed considerably after passing through the fiber grating, typically on the same order of magnitude as the spectral width of the fiber grating.

A factor affecting the gain of Er-doped fiber amplifier 120, is the wavelength used to optically pump Er-doped fiber 125. Due to its higher gain efficiency (4 dB/mW), Er-doped fiber 125 is preferably pumped near its 980 nm absorption band, which is twice as efficient as its 1480 nm absorption band. Moreover, a disadvantage of pumping at 980 nm is that the pump bandwidth to which the erbium will respond is quite narrow, requiring the wavelength of the pump laser to be stabilized for optimal power transfer. Pump powers of about 250–500 mW or higher, however, are typically needed to excite the erbium atoms to their higher energy state, depending on the number of optical channels present. Several low power pump lasers may be employed to generate such pump power level to ensure reliability, particularly for 980 nm pump lasers for which less reliability data is available.

In accordance with the principles of the invention, one or more, such as three pump lasers $140_{1-3}$, nominally lasing within the 980 nm absorption band of Er-doped fiber 125, are optically coupled to fiber 105 for co-directionally pumping the optical signals. Alternatively, the optical signals may be pumped counter-propagating or bidirectionally. Preferably, WDM couplers $145_{1-3}$ are used for coupling the pump beams from each corresponding pump laser $140_{1-3}$ to fiber 105 over which the optical signals are propagating, while simultaneously allowing the transmitted optical signals to propagate through fiber 105. Such couplers may be realized in fiber, semiconductor and dielectric waveguide devices. Also, optical elements such as dichroic mirrors may be utilized for optical coupling.

Figure 3:
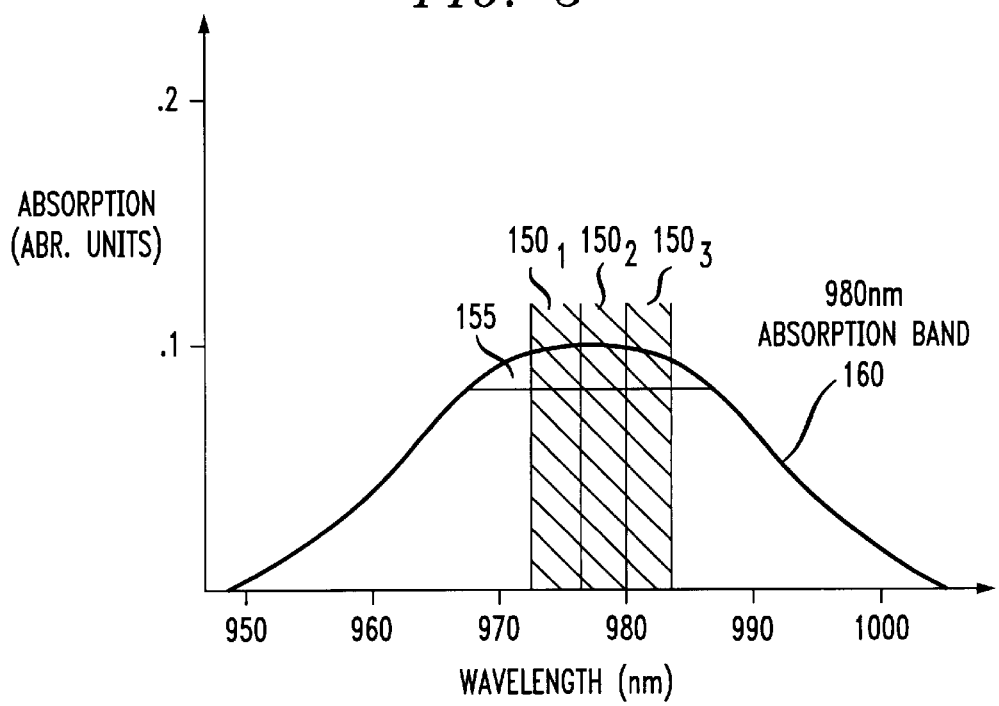
FIG. 3 shows an exemplary graph of the 980 nm absorption band of the Erbium-doped fiber of FIG. 1, along with allocated wide bands of wavelengths for the pump lasers.

As depicted in FIG. 3, wide bands of wavelengths of about a few nanometers (1–10 nm), are allocated within which the respective wavelength of the pump lasers must stay. More specifically, there are shown three corresponding wide bands of wavelengths $150_{1-3}$ of about three (3) nanometers wide, falling within a portion of the 980 nm absorption band 160 of the Erbrium doped fiber, which have been allocated to pump lasers $140_{1-3}$, respectively. That is, the lasing wavelengths of pump lasers $140_{1-3}$ are allowed to wander anywhere within its respective allocated band, thereby extending each pump laser's range of operation. These bands of wavelengths herein referred to as "pump wavebands" are allocated within preferably only a small center portion 155 of the 980 nm absorption band where the absorption is at least more than 80% of its peak value, thereby ensuring a substantially uniform optical gain over allocated pump wavebands $150_{1-3}$. Note that for 980 nm absorption band 160, this center portion may only be about 10–15 nm wide.

Figure 4:
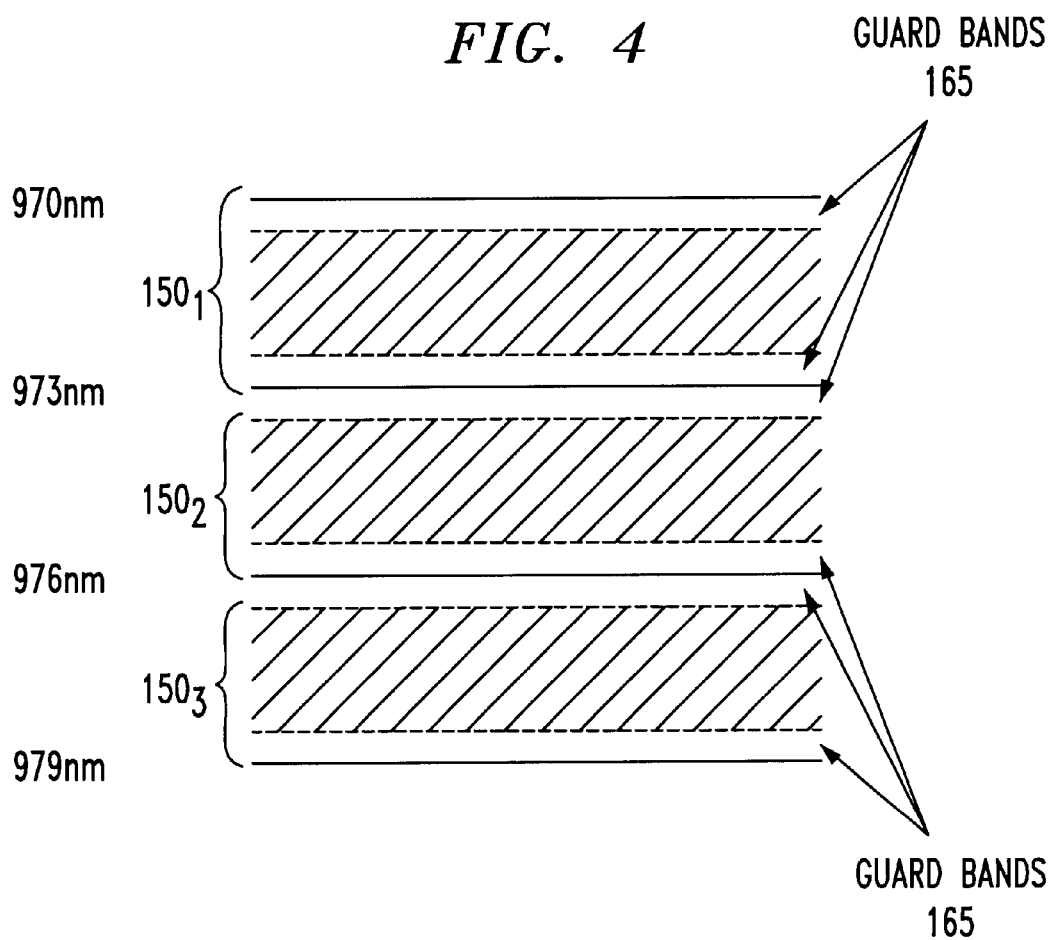
FIG. 4 shows an exemplary depiction of the allocated wide bands of wavelengths along with guard bands near the edges of the pump wavebands.

Preferably, the pump beams wander only within a smaller portion of wavebands $150_{1-3}$ to facilitate combining and filtering the pump beams into and out of transmission fiber 105 with some high degree of precision. Accordingly, there are guard bands 165 of about 5% or more of the width of the pump wavebands near each edge of allocated bands $150_{1-3}$ where the pump beams should not reside, as further depicted in FIG. 4. Also, allocated pump wavebands $150_{1-3}$, preferably are of equal width, and thus their widths depend on the number of pump lasers employed. That is, the width of each allocated waveband is the width of the useable portion of the chosen absorption band divided by the number of pump lasers. In general, the more pump lasers the better, but there will usually be a reliability/cost tradeoff. Also, with larger numbers of pump lasers, the widths of the allocated pump wavebands become increasing smaller, making wavelength stabilization again a critical issue.

In previous WDM lightwave communication systems, each pump laser is required to lase precisely at a predetermined wavelength. As a result, stabilizing the wavelength, particularly with temperature, is a critical issue in the prior art. Contrastingly, in the present invention, allowing each pump beam to reside anywhere within its respective pump waveband extends, for example, the range over which the pump lasers may operate within, thereby making wavelength stabilization less critical to system operation. As such, wavelength variations due, for example, to material degradation, or temperature variations, is less critical and does not substantially affect the operation of the communications system.

Although the lasing wavelengths of pump lasers $140_{1-3}$, can wander anywhere within their allocated pump wavebands $150_{1-3}$, each pump laser $140_{1-3}$ is still preferably wavelength stabilized within its respective allocated pump waveband $150_{1-3}$ by means of fiber Bragg gratings $170_{1-3}$, but having an appropriately wide spectral width that corresponds to about the width of its respective allocated waveband. These wide pump wavebands, however, can be used advantageously to extend the temperature range over which the external fiber bragg grating can stabilize the pump laser, as discussed herein below.

Figure 5:
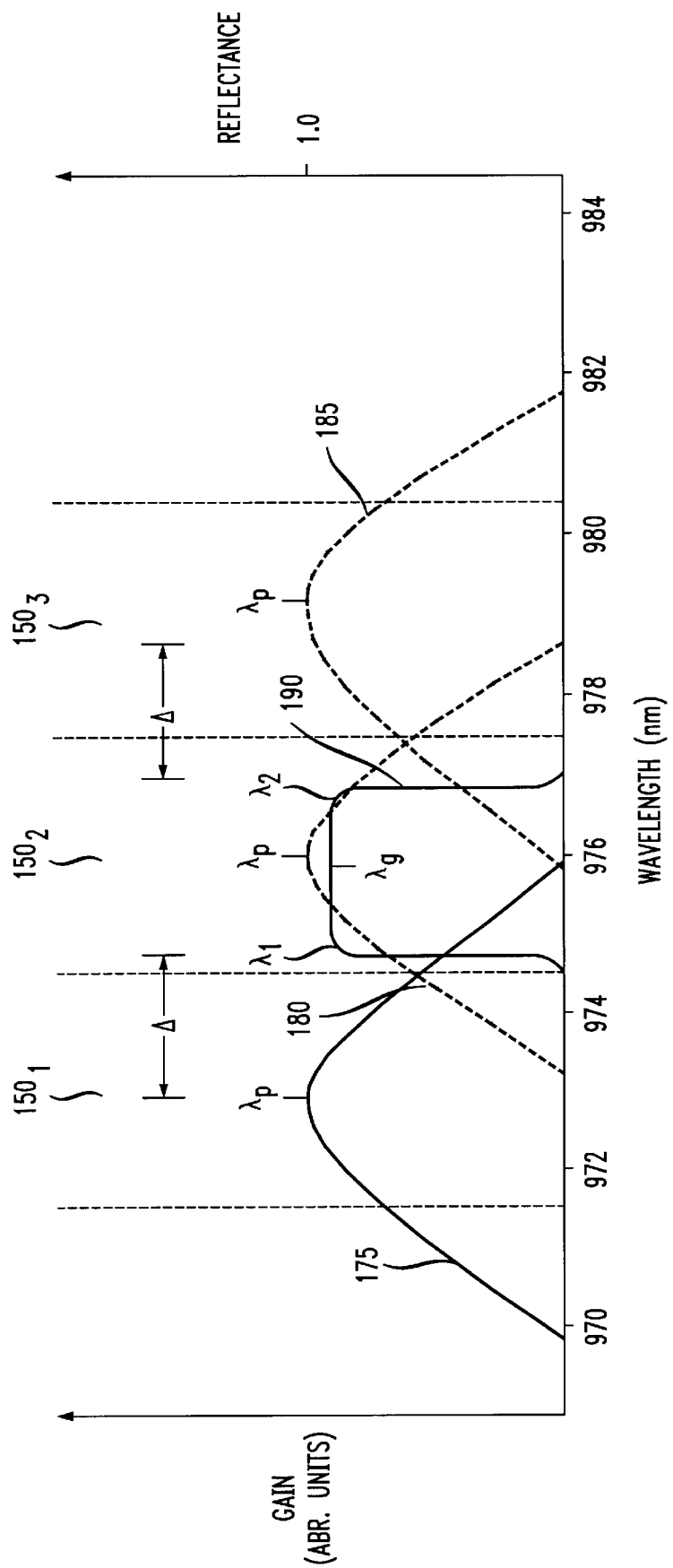
FIG. 5 shows exemplary graphs of the gain versus wavelength for one of the pump laser of FIG. 1, along with an exemplary graph of the fiber grating's reflection band used to stabilize lasing with variations in temperature.

How the temperature range is extended is more clearly illustrated in FIG. 5 which displays for one of the pump lasers $140_{1-3}$ its gain versus wavelength with variations in temperature, herein represented by gain curves 175, 180 and 185. Also shown in FIG. 5, is an exemplary reflection band 190 for one of the fiber gratings $170_{1-3}$ judiciously designed such that its spectral bandwidth is at least substantially coextensive with or less than, for example, the width of allocated waveband $150_2$ within which the corresponding pump laser must reside. Note that in this example, pump wavebands $150_{1-3}$ are nominally spaced about three (3) nm apart, with guard bands of about 0.75 nm used to facilitate multiplexing and demultiplexing the pump beams. The center of reflection band 190 has been denoted as $\lambda_g$. Also, note that the spectral bandwidth's full-width half maximum "FWHM" is about 1.5 nm. Apodisation is preferably employed to vary the strength and length of the variations in the refractive index of the fiber grating so as to remove strong reflection peaks typically observed near reflection band 190 as well as to equalize the reflectance across its bandwidth, thereby producing the depicted "squared-off" reflection band.

At lower temperatures, so long as laser's gain peak wavelength $\lambda_p$ is within the laser's locking range $\Delta$, the pump laser's lasing wavelength locks to the grating's left edge wavelength $\lambda_1$ (~975.5 nm). As the temperature now varies and the gain peak wavelength $\lambda p$ shifts right and within reflection band 190, the lasing wavelength of pump laser $150_2$ coincides with its gain peak wavelength, until it similarly locks onto the grating's other edge wavelength $\lambda_2$ (~977 nm). In this manner, the pump laser's locking range is extended the temperature equivalent of about the spectral width of reflection band 190, which is a resulting effect of allowing the lasing wavelength to wander within allocated pump waveband $150_2$. Similarly, this occurs for the other pump lasers, but is not shown in FIG. 5 for the sake of clarity.

Recall that in a conventional grating configuration which has a correspondingly narrow spectral width, the pump laser is locked to lase precisely at a desired wavelength, even with variations in temperature. Likewise, the gain peak wavelength shifts about a few tenths of a nanometer per degree centigrade (nm/° C.), but remains locked to the grating center wavelengths over the corresponding temperatures locking range.

In the above example, however, allocating about three (3) nanometers to each pump wavebands $150_{1-3}$, each with 1.5 nm wide guard bands, extends the effective locking range of the pump lasers by the temperature equivalent of about 1.5 nm. Inasmuch as the gain peak wavelength $\lambda_p$ shifts about a few tenths of a nanometer per degree centigrade, this 1.5 nm translates into extending the locking range by about 4.5° C. to about 7.5° C. The actual amount that the locking range is extended, however, is highly dependent on the overall lasing properties of the pump laser, among other things.

It should be understood that the embodiments herein above are merely illustrative of the principles of the invention. Various modifications may be made by those skilled in the art which will embody the principles of the invention and fall within the spirit and the scope thereof.

What is claimed is:

1. A lightwave communication system carrying over an optical transmission fiber at least one or more optical signals, said lightwave communication system comprising:
   an optical fiber amplifier having an optical fiber gain medium;
   a plurality of pump lasers optically coupled to said optical fiber for pumping the optical fiber gain medium so as to amplify said at least one or more optical signals while propagating along the optical fiber gain medium;
   allocated bands of wavelengths lying within an absorption region of the optical fiber gain medium within which the wavelengths of light from corresponding pump lasers may vary, each of said plurality of pump lasers having an unique allocated band of wavelengths; and
   means for stabilizing the lasing wavelength of each pump laser so as to reside within the corresponding allocated band of wavelengths over a desired operating temperature range.

2. The lightwave communication system of claim 1 wherein said allocated bands of wavelengths are about 1 nm to about 10 nm wide.

3. The lightwave communication system of claim 1 wherein said allocated bands of wavelengths fall within a portion of the absorption region of the optical fiber gain medium.

4. The lightwave communication system of claim 3 wherein the width of each allocated band of wavelengths is the width of said portion of the absorption region divided by n, wherein n is the number of pump lasers.

5. The lightwave communication system of claim 1 further comprising a plurality of transmission lasers for generating said at least one or more optical signals.

6. The lightwave communication system of claim 1 further comprising means for coupling said at least one or more optical signals into said optical transmission fiber.

7. The lightwave communication system of claim 1 wherein said at least one or more optical signals is each transmitted over a corresponding optical channel.

8. The lightwave communication system of claim 7 wherein each of said at least one or more optical signals resides within a center portion of the corresponding optical channel.

9. The lightwave communication system of claim 7 wherein the optical channels are spaced apart from about 100 GHz to about 400 GHz.

10. The lightwave communication system of claim 1 wherein said at least one or more optical signals fall within the 1.55 µm region of the optical transmission fiber.

11. The lightwave communication system of claim 1 wherein said optical fiber amplifier includes an Erbium doped optical fiber amplifier.

12. The lightwave communication system of claim 11 wherein said optical fiber gain medium includes an Erbium doped optical fiber.

13. The lightwave communication system of claim 11 wherein said at least one or more optical signals fall within the optical gain spectrum of the Erbium doped optical fiber amplifier.

14. The lightwave communication system of claim 13 wherein the optical gain spectrum is between about 1530 nm to about 1570 nm.

15. The lightwave communication system of claim 13 wherein the allocated bands of wavelengths fall within a center portion of the 980 nm absorption band of the Erbium doped optical fiber.

16. The lightwave communication system of claim 15 wherein the center portion of the 980 nm absorption band has an absorption value of about at least 80% of the peak absorption value.

17. The lightwave communication system of claim 13 wherein the center portion of the 980 nm absorption band is about 10 nm to about 15 nm wide.

18. The lightwave communication system of claim 1 wherein said allocated bands of wavelengths have guard bands near the edges of the allocated bands.

19. The lightwave communication system of claim 18 wherein said guard bands have a width about 5% of the width of the allocated bands of wavelengths.

20. The lightwave communication system of claim 1 wherein said means for stabilizing includes fiber bragg gratings.

21. The lightwave communication system of claim 20 wherein said fiber bragg gratings have a squared-off reflection band.

22. The lightwave communication system of claim 21 wherein said fiber bragg gratings have a FWHM bandwidth substantially coextensive with or less than the width of said allocated bands of wavelengths.

23. The lightwave communication system of claim 22 wherein said allocated bands of wavelengths each has a width of about 1 nm to 10 nm.

24. A Lightwave communication system comprising:
   an optical fiber including a section of Er-doped fiber;
   a plurality of transmission lasers for generating optical signals carried over said optical fiber, said optical signals each having a wavelength falling within the gain spectrum of the Er-doped fiber;
   pump lasers, each generating pump light falling within a center portion of an absorption band of the Er-doped fiber, for optically pumping the Er-doped fiber so as to amplify the optical signals; and
   fiber bragg gratings, each restricting the lasing wavelength of a corresponding pump laser within an unique allocated band of wavelengths, said allocated bands spaced apart about 1 nm to about 10 nm.

25. The lightwave communication system of claim 24 wherein said allocated bands of wavelengths are about 1 nm to about 10 nm wide.

26. The lightwave communication system of claim 24 wherein the width of each of said allocated bands of wavelengths is the width of said center portion of the absorption region divided by n, wherein n is the number of pump lasers.

27. The lightwave communication system of claim 24 further comprising means for coupling said optical signals into said optical fiber.

28. The lightwave communication system of claim 24 wherein said optical signals are each transmitted over a corresponding optical channel.

29. The lightwave communication system of claim 28 wherein each of said optical signals resides within a center portion of the corresponding optical channel.

30. The lightwave communication system of claim 29 wherein the optical channels are spaced apart from about 100 GHz to about 400 GHz.

31. The lightwave communication system of claim 24 wherein said optical signals fall within the 1.55 μm region of the optical fiber.

32. The lightwave communication system of claim 24 wherein the gain spectrum of the Er-doped fiber is between about 1530 nm to about 1570 nm.

33. The lightwave communication system of claim 24 wherein the center portion of the absorption band of the Er-doped fiber has an absorption value of about at least 80% of the peak absorption value.

34. The lightwave communication system of claim 24 wherein the center portion of the absorption band is about 10 nm to about 15 nm wide.

35. The lightwave communication system of claim 24 wherein said allocated bands of wavelengths have guard bands near the edges of the allocated bands.

36. The lightwave communication system of claim 35 wherein said guard bands have a width about 5% of the width of the allocated bands of wavelengths.

37. The lightwave communication system of claim 24 wherein said fiber bragg gratings have a squared-off reflection band.

38. The lightwave communication system of claim 24 wherein said fiber bragg gratings have a FWHM bandwidth substantially coextensive with or less than the width of said allocated bands of wavelengths.

39. A lightwave communication system comprising:
an optical fiber including a section of Er-doped fiber;
a plurality of transmission lasers for generating optical signals carried over said optical fiber, said optical signals each having a wavelength falling within the gain spectrum of the Er-doped fiber;
pump lasers, each generating pump light falling within a center portion of the 980 nm absorption band of the Er-doped fiber;
a fiber coupler for directing the pump light into the Er-doped fiber so that said pump light optically pumps the Er-doped fiber thereby amplifying the optical signals; and
fiber bragg gratings having substantially squared-off reflection bands, each centered at the nominal lasing wavelength of a corresponding pump laser for stabilizing the lasing wavelength thereof so as to reside within an unique allocated band of wavelengths of about 1 to about 10 nm wide.

40. The lightwave communication system of claim 39 wherein the width of each of said allocated band of wavelengths is the width of said center portion of the 980 nm absorption region divided by n, wherein n is the number of pump lasers.

41. The lightwave communication system of claim 39 wherein said optical signals is each transmitted over a corresponding optical channel.

42. The lightwave communication system of claim 41 wherein each of said optical signals resides within a center portion of the corresponding optical channel.

43. The lightwave communication system of claim 42 wherein the optical channels are spaced apart from about 100 GHz to about 400 GHz.

44. The lightwave communication system of claim 39 wherein said optical signals fall within the 1.55 μm region of the optical transmission fiber.

45. The lightwave communication system of claim 39 wherein the gain spectrum of the Er-doped fiber is between about 1530 nm to about 1570 nm.

46. The lightwave communication system of claim 39 wherein the center portion of the 980 nm absorption band is about 10 nm to about 15 nm wide.

47. The lightwave communication system of claim 39 wherein said allocated bands of wavelengths have guard bands near the edges of the allocated bands.

48. The lightwave communication system of claim 47 wherein said guard bands have a width about 5% of the width of the allocated bands of wavelengths.

49. The lightwave communication system of claim 39 wherein said fiber bragg gratings have a FWHM bandwidth substantially coextensive with or less than the width of said allocated bands of wavelengths.

* * * * *